US008540003B2

(12) United States Patent
Cooper

(10) Patent No.: US 8,540,003 B2
(45) Date of Patent: Sep. 24, 2013

(54) LABELING APPARATUS

(75) Inventor: Michael Cooper, Colchester (GB)

(73) Assignee: Catchpoint Limited (GB)

(*) Notice: Subject to any disclaimer, the term of this patent is extended or adjusted under 35 U.S.C. 154(b) by 212 days.

(21) Appl. No.: 12/937,317

(22) PCT Filed: Apr. 16, 2009

(86) PCT No.: PCT/GB2009/000985
§ 371 (c)(1), (2), (4) Date: Dec. 28, 2010

(87) PCT Pub. No.: WO2009/136138
PCT Pub. Date: Nov. 12, 2009

(65) Prior Publication Data

US 2011/0100557 A1 May 5, 2011

(30) Foreign Application Priority Data

Apr. 16, 2008 (GB) .................................. 0806858.7

(51) Int. Cl.
*B32B 37/00* (2006.01)
*B32B 37/02* (2006.01)
*B32B 38/00* (2006.01)
*B32B 38/04* (2006.01)

(52) U.S. Cl.
USPC ............ 156/521; 156/510; 156/516; 156/517

(58) Field of Classification Search
USPC .................................. 156/510, 516, 517, 521
See application file for complete search history.

(56) References Cited

U.S. PATENT DOCUMENTS

| | | | | |
|---|---|---|---|---|
| 5,674,345 | A * | 10/1997 | Nash | 156/264 |
| 6,726,796 | B2 * | 4/2004 | Wells et al. | 156/277 |
| 6,786,263 | B1 | 9/2004 | Fox, Jr. et al. | |
| 2002/0168212 | A1 * | 11/2002 | Nedblake et al. | 400/621 |

FOREIGN PATENT DOCUMENTS

WO WO 2004/005141 A1 1/2004

OTHER PUBLICATIONS

International Search Report, PCT/GB2009/000985, Catchpoint Limited, mailed Oct. 8, 2009, 3 pages.

* cited by examiner

*Primary Examiner* — Mark A Osele
*Assistant Examiner* — Christopher C Caillouet
(74) *Attorney, Agent, or Firm* — McKee, Voorhees & Sease, P.L.C.

(57) ABSTRACT

The invention relates to apparatus which can be used to apply self adhesive labels (2) from a label supply (14,100), with said apparatus requiring no or very little alteration to allow the same to be used to apply labels which are provided on a backing layer or labels which are provided from a linerless label supply. This allows the use of the apparatus to be significantly wide ranging while ensuring that the accuracy of application is still maintained.

7 Claims, 5 Drawing Sheets

LABELING APPARATUS

CROSS-REFERENCE TO RELATED APPLICATIONS

This is a National Phase application claiming priority to PCT/GB2009/000985 filed Apr. 16, 2009 which claims priority to GB 0806858.7 filed Apr. 16, 2008, all of which are herein incorporated by reference in their entireties.

The invention to which this application relates is to an apparatus and method which allows the movement of self adhesive labels to an application location and the subsequent application of the self adhesive labels therefrom onto an article.

The application of self adhesive labels using automated or semi automated apparatus is well known. Conventionally the labels are carried on a backing layer of sheet material to the point of application at which the labels are removed from the backing layer to expose adhesive thereon to allow the labels to then be applied to an article. The applicant has also developed apparatus and a method which allows the application of labels which do not need to be carried on a backing layer and which are typically referred to as linerless self adhesive labels systems. Such systems are described in the applicant's previous applications GB2403296 and EP1839293.

The aim of the present invention is to provide apparatus and a method which allows additional benefits to be obtained over and above the previously known apparatus. A further aim is to provide apparatus and a method which allows a wider range of self adhesive label types to be applied in a linerless form than has previously been possible. A yet further aim is to provide apparatus and a method which can be used to apply self adhesive labels in both linerless form or with a backing layer with no, or relatively little, adaptation of the apparatus or method required to be performed.

In a first aspect of the invention there is provided apparatus for the application of self adhesive labels sequentially from a supply of self adhesive labels, said apparatus including means for moving the self adhesive labels web from the supply to an application point, said application point including means to cause release of the leading label from the web of self adhesive labels and expose the said released label to be further transported and/or applied to an article and wherein said apparatus is, or can be adapted to be, capable of operation with a supply of labels with a backing layer and a supply of labels without a backing layer.

Typically the supply of labels is provided in the form of a roll or spool of labels, hereinafter referred to as a roll.

In one embodiment the means to cause release of the leading label is a blade or beak, said form of blade or beak used changeable between a first form to allow the release of a label from a linerless roll of self adhesive labels and a second form to allow the release of a label from a roll of self adhesive labels with a backing layer. In one embodiment the two forms of blade or beak are provided on the same component. In one embodiment said component is movable between positions in the appropriate first or second form.

In a further embodiment, the apparatus includes a blade or beak to allow the release of linerless self adhesive labels and a blade or beak for the release of labels carried on a backing layer, said respective beaks or blades provided at different locations and selectively used dependent upon the particular roll of self adhesive labels being applied at that time.

In whichever arrangement the apparatus can be relatively easily and quickly adapted.

In one embodiment the means for moving the labels from the roll to the application point includes at least two movement means which act on the labels to move the same. In one embodiment at least one of the said movement means is located so as to act on the non adhesive side of the labels. In one embodiment the movement means act on the adhesive side of the label either directly in the case of linerless self adhesive label supplies or on the backing layer onto which the adhesive surface of the label is applied, and the movement means typically comprise a belt, and in one embodiment, a plurality of belts.

In one embodiment the belts acting on the adhesive side are provided in a split configuration which is selected to aid the release of labels from the same when used in a linerless self adhesive label mode.

Typically the movement means which acts on the non adhesive side of the self adhesive label is provided in a form so as to encourage movement of the self adhesive label web towards the application location and, more particularly, away from the other set of movement means. In one embodiment this is achieved via the generation of an airflow such as by using a vacuum box which, in addition to enhancing the movement of the labels, also ensures that the linerless self adhesive labels release from the belts on the adhesive side.

In one embodiment the movement of the self adhesive labels during the application process is continuous. Alternatively the movement is stopped when it is required to separate the leading label from the remaining self adhesive labels via the beak or blade, with a line of weakening which is to be separated to allow the leading label to be applied to an article positioned at the said beak or blade.

In one embodiment the continuous or non-continuous movement options may be selected to suit particular label and/or application conditions.

In one embodiment the adhesive is applied to the labels surface in a series of strips, with at least one gap left between said strips, and which gap is exposed at at least one edge of the label so as to allow the escape of air bubbles from under the label when applied to an article.

In one embodiment lines of weakening are provided between adjacent labels, said lines of weakening including at least one slit which is located and shaped so as to engage with a location formed on the beak or blade and which location aids the accurate release of the self adhesive label along the line of weakening. One form of the line of weakening could be that described in the applicant's co-pending application GB0717525.0.

In one embodiment the blade may be fixed in position or alternatively can be located on a rotating shaft the rotation of which is timed to assist the separation of the label when the label is applied to the article and tension is created in the web.

In one embodiment, when the adhesive is applied in strips, a gap is provided with no adhesive in alignment with each slit which is provided.

Typically each released label is applied to an article, the path and movement of which with respect to the label to be released is selected so as to optimise the release of the label and application of the same to the article.

In a further aspect of the invention there is provided apparatus for the application of labels sequentially from a supply of self adhesive labels, said apparatus including means for moving the self adhesive labels web from the supply to an application point, said application point including means to cause release of the leading label from the supply of self adhesive labels and expose the said released label to be further transported and/or applied to an article and wherein said means for moving the self adhesive label web include a plurality of movement means with said movement means located to act on opposing planar surfaces of the self adhesive labels web.

In one embodiment the movement means located to act on the surface of the self adhesive labels web opposing that to which adhesive is applied includes an airflow to draw the web towards the same.

In one embodiment the said airflow is created by a vacuum and the movement means acts on a shorter length of the self adhesive labels web than the belt or belts acting on the opposing surface of the self adhesive labels web.

In one embodiment the belt or belts acting on the opposing surface are provided with a release coating.

In a yet further aspect of the invention there is provided apparatus for the application of labels sequentially from a supply of self adhesive labels, said apparatus including means for moving the self adhesive labels web from the supply to an application point, said application point allowing release of the leading label from the supply of self adhesive labels and expose the said released label to be further transported and/or applied to an article and wherein said means for moving the self adhesive label web include a plurality of belts located to act on the surface of the self adhesive labels web to which adhesive is applied or on a backing layer contacting said adhesive.

In one embodiment said plurality of belts are located with their longitudinal axes parallel. Typically said belts are located such as to support substantially the width of the self adhesive labels web for a given distance and then at least one of said belts extends further downstream with respect to the direction of movement of the self adhesive labels web so as to support a reduced portion of the width of the self adhesive labels web for a given distance. Typically said belt that extends further is located to support a centre portion of the self adhesive labels web and preferably supports the same for a distance until the self adhesive labels web reaches a belt located to act on the opposing surface of the self adhesive labels web.

In a further aspect of the invention there is provided a method of applying labels from a linerless self adhesive label web or web with a backing layer using apparatus as herein described.

In one embodiment there is provided apparatus for the application of labels in sequence from a roll of labels, said apparatus including a transfer belt mechanism with a single belt. In a first arrangement the leading label is delivered for application or movement for application from a dispensing arrangement using a pulley belt arrangement when the label supply is linerless. In a second arrangement of the apparatus, when the label supply is provided with a backing layer, a dispensing beak is located in advance of the pulley belt arrangement to allow the backing layer to be removed from the leading label or labels whereupon the freed label or labels are then advanced towards the application pulley belt arrangement.

In a further arrangement of the invention there is provided apparatus for the use of dispensing labels for application to further articles, said apparatus including a first belt and at least one further belt, said first and second belts staggered in terms of relative speed.

In one embodiment there is provided a central belt and a belt on either side thereof. In one embodiment the said belts on either side are running at a first speed and the central belt is run at a different speed.

In one embodiment, the labels are advanced to the point of separation from the remaining labels and are located and moved by a vacuum air flow in order to be applied to the article and present the supply of labels to a blade at allocation such that the blade breaks the line of weakening between the leading label and the following label once the labels come under tension. The relative positions of the blade and the vacuum air flow and hence label can typically be adjusted so as to locate the same with respect to the location of the line of weakening which is to be broken. Typically this arrangement is particularly suited to the application of labels from a linerless label supply which is formed from relatively thin film.

A further embodiment is provided to be used if there is provided a backing layer for a thin film label supply. In this case the same arrangement as described in the preceding paragraph is used with the addition of a dispensing beak in advance of the vacuum air flow so as to separate the backing layer from the leading label or labels.

In yet further embodiment when a backing layer is provided, the backing layer is provided with one or more lines of weakening which run along the length of the label supply, typically in parallel with the longitudinal axis of the label supply. These lines of weakening are sufficient to allow the same to be broken and allow the centre portion of the backing layer to be removed and labels then to be transferred by belt to the point of application to a further article.

Typically the lines of weakening are formed in the backing layer but do not pass into the label layer itself. Typically this arrangement is used with the centre belt and the two side belts and the width of the centre belt is substantially equivalent to the width of the centre portion of the backing layer which is defined by the lines of weakening such that the exposed portion of the adhesive of the label overlies the centre belt.

Typically the two remaining portions of the backing layer are removed when the labels reach the end of the transfer belt and are exposed for application.

Specific embodiments of the invention are now described with reference to the accompanying drawings in which.

Figure 3A:
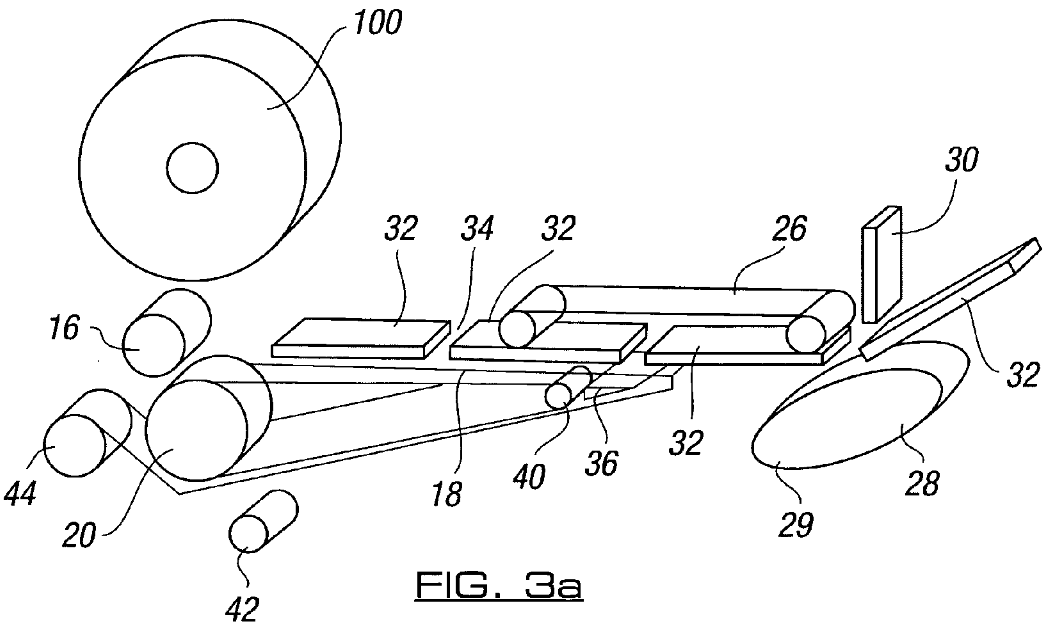
Figure 4:
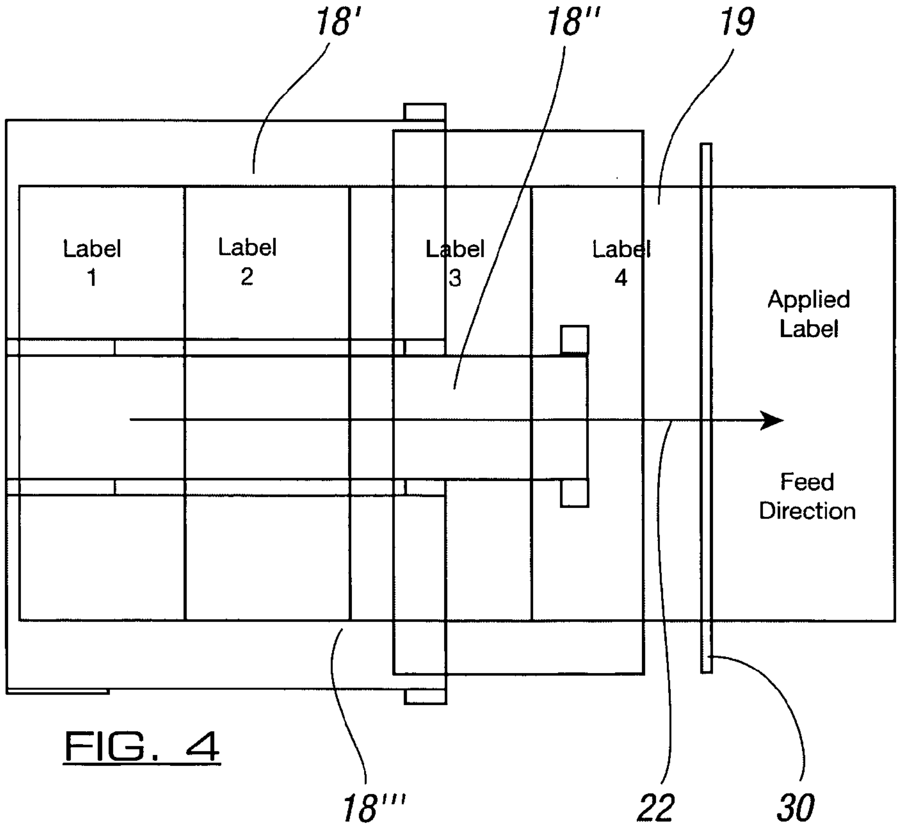
Figure 5:
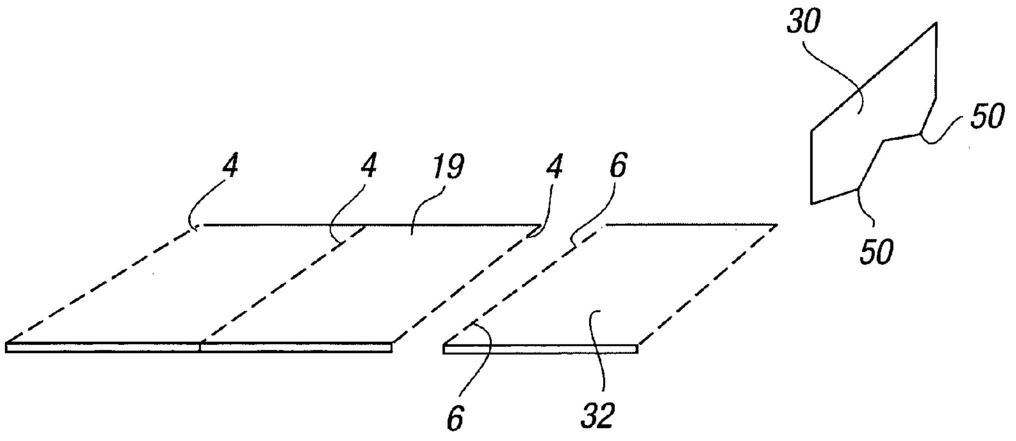
Figure 6A:
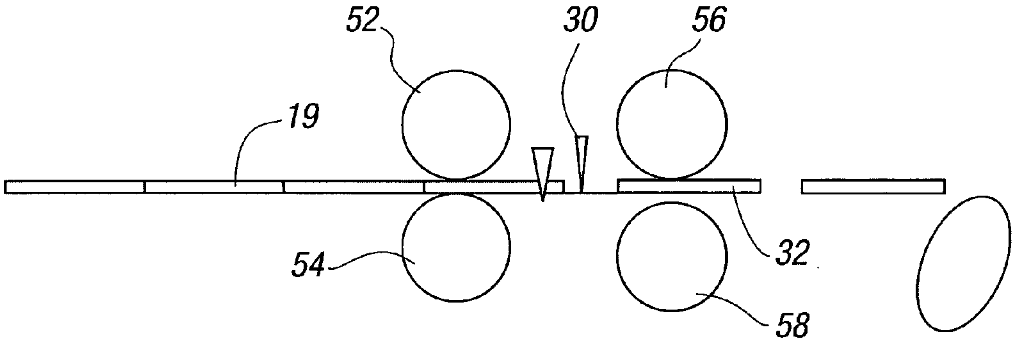
Figure 6B:
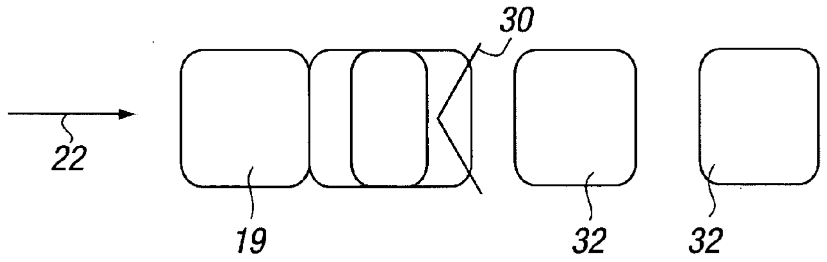
Figure 7:
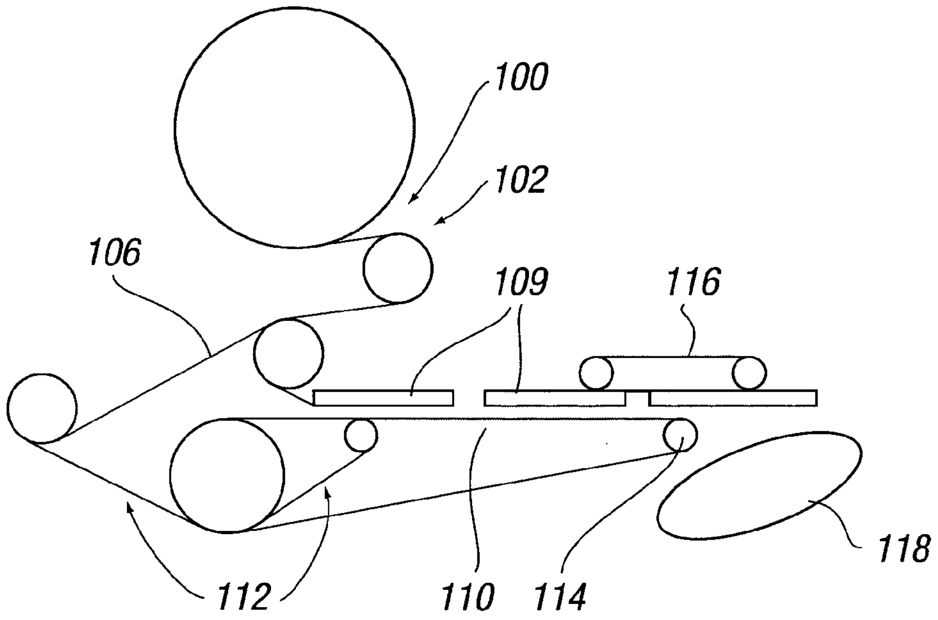
Figure 8:
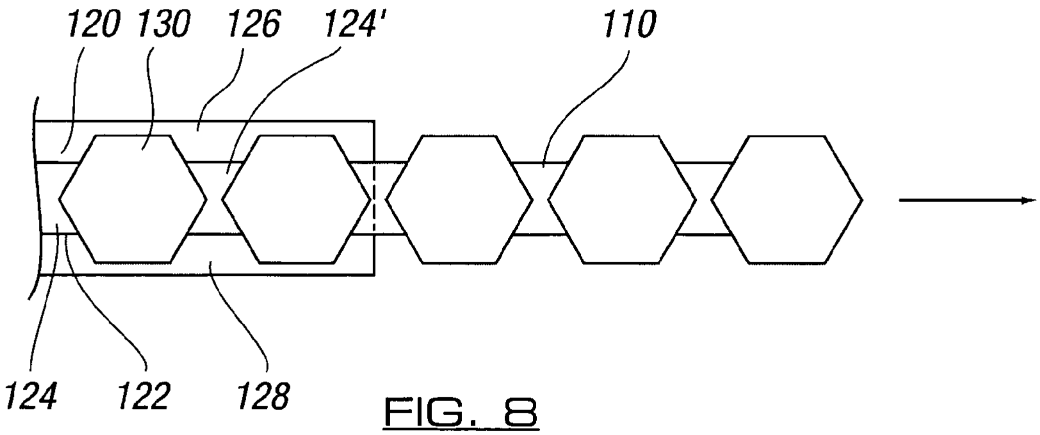

FIGS. 3*a* and *b* illustrate in a schematic manner two embodiments of application apparatus for selective use with a roll of linerless self adhesive labels or a roll of self adhesive labels with a backing layer;

FIG. 4 illustrates an arrangement of drive belts in accordance with one embodiment of the invention;

FIG. 5 illustrates the manner in which linerless self adhesive labels can be separated from the roll;

FIGS. 6*a-b* illustrate the manner in which a continuous movement of the label feed can be provided;

FIG. 7 illustrates a further embodiment of apparatus for applying labels in accordance with the invention; and FIG. 8 illustrates an embodiment of a label supply for use with apparatus in accordance with one embodiment of the invention.

Figure 1:
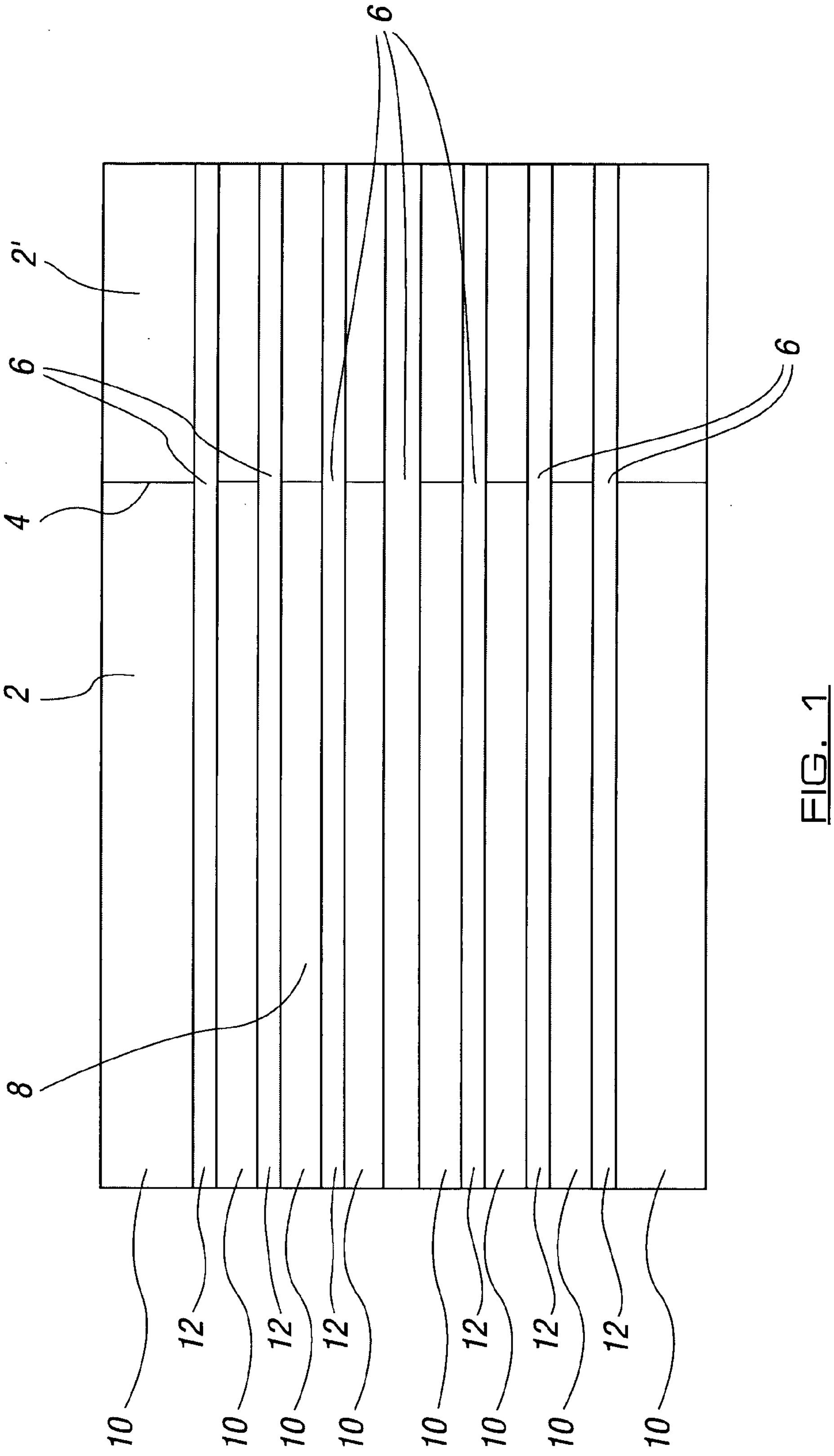
FIG. 1 illustrates the pattern of application of adhesive to one side of a label in accordance with one embodiment of the invention.

Referring firstly to FIG. 1 there is illustrated a label 2 which is joined to an adjacent label 2' on a roll of self adhesive labels. The join between the labels 2, 2' is formed by a line of weakening 4 which is in this form provided in the form of a cut line with a series of joins or "catches" at spaced intervals which join the labels together. Also provided are one or more larger slits 6 formed as shown. One or more of these slits can be used as location means for separation purposes as will be explained subsequently. The surface 8 shown has adhesive applied thereto in strips 10 with gaps 12 therebetween. The gaps run to the edge of the label so as to allow any air bubbles which may be trapped as the label is applied to the article, to move along the gaps and hence escape at the edge of the label. This ensures that the label is accurately and efficiently applied in position. It is also preferred that the gaps 12 are provided in axial alignment with the slits 6 to minimise the risk of adhesive bleeding occurring. However it should also be appreciated that the adhesive can be applied uniformly across the whole surface or in another pattern and that all variations can be used with the apparatus as herein described.

Figure 2:
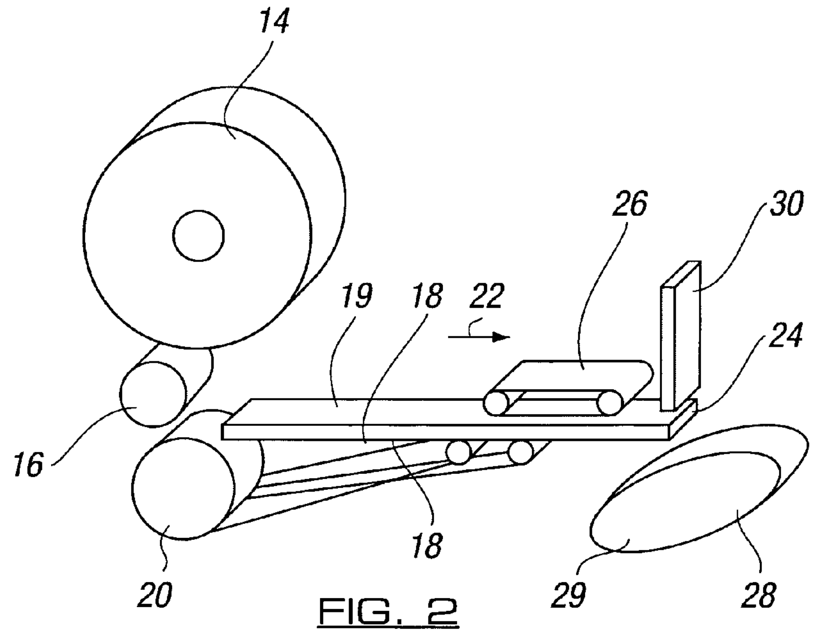
FIG. 2 illustrates in a schematic manner an embodiment of application apparatus for a roll of linerless self adhesive labels in accordance with the invention.

FIG. 2 illustrates a first form of apparatus in accordance with one embodiment of the invention and in this case the application apparatus is in a configuration for use to apply linerless self adhesive labels which are relatively thin and which, conventionally, can be difficult to apply or indeed may not be able to be applied using current automated apparatus. The apparatus comprises supply of labels in the form of a roll 14 of, in this case, linerless self adhesive labels. The leading edge of the labels is then passed to a transfer roller 16 which unwinds the self adhesive label web 19 forward onto a delivery belt 18 driven by roller 20 and which is typically coated with silicone or another release agent as this belt contacts with the exposed adhesive surface of the labels. The belt is driven by the roller 20 to move the self adhesive label web in the direction 22 towards the application location 24. As the self adhesive label web moves toward this location it passes under and is acted on by a movement means in the form of an airflow, typically created by vacuum and which movement means is hereinafter referred to as a vacuum transfer means 26. It should be appreciated that reference to a vacuum means should be interpreted in a non-limiting manner inasmuch that it can encompass any mechanism which can act to draw the labels away from the delivery belt 18. One alternative, for example, is to provide an airflow by, for example, a fan, with the airflow moving away from the delivery belt to draw the web 19 away from the same. The vacuum transfer means, in addition to encouraging movement of the self adhesive label web in direction 22, also encourages the movement of the web towards the same and hence avoids the possibility of the labels adhering to the delivery belt 18.

The continued advancement of the self adhesive label web brings the leading label to and beyond the application point at which the front edge of the label is positioned, with the adhesive surface thereon exposed to make contact with the moving article 28 to which the same is to be applied and which moves in the direction of arrow 29.

The application to the article and continued movement of the same draws the leading label onto the same and also brings the line of weakening 4, shown in FIG. 1, defining the trailing edge of the leading label, into contact with the edge of separating means in the form of a blade 30 to cause the release of the label and allows the same to move away adhered to the article. At this stage the movement of the web may be stopped temporarily as the leading label is broken away. The surface contact between the label and the delivery belt 18 provides sufficient tension to ensure separation of the leading label from the self adhesive label web along the line of weakening and provides an exact and predictable stop position for the forward edge of the next label. In one embodiment, as the next article to be labelled arrives at the application point, a sensor triggers the label application sequence.

In one embodiment, the delivery belt can be formed of a series of belts in a specific configuration, one of which is subsequently described with regard to FIG. 4.

The sequence of operation is repeated for successive articles and labels from the supply of labels.

FIGS. 3*a* and *b* illustrate two similar embodiments of the apparatus which can be used to selectively apply labels from a linerless roll of labels or a roll of labels which include a backing layer which needs to be removed. In both cases there is provided a roll 100 of self adhesive labels which may be linerless or with a backing layer. The self adhesive labels web is fed past transfer roller 16 and passes onto a delivery belt 18. In both cases shown the roll has a backing layer and so there is a die cut gap 34 left between the labels 32 on the backing layer web.

In FIG. 3*a* the apparatus includes the vacuum movement means 26 which may selectively be utilised and is of greater assistance when dispensing linerless self adhesive labels for the reasons described with respect to FIG. 2.

Figure 3B:
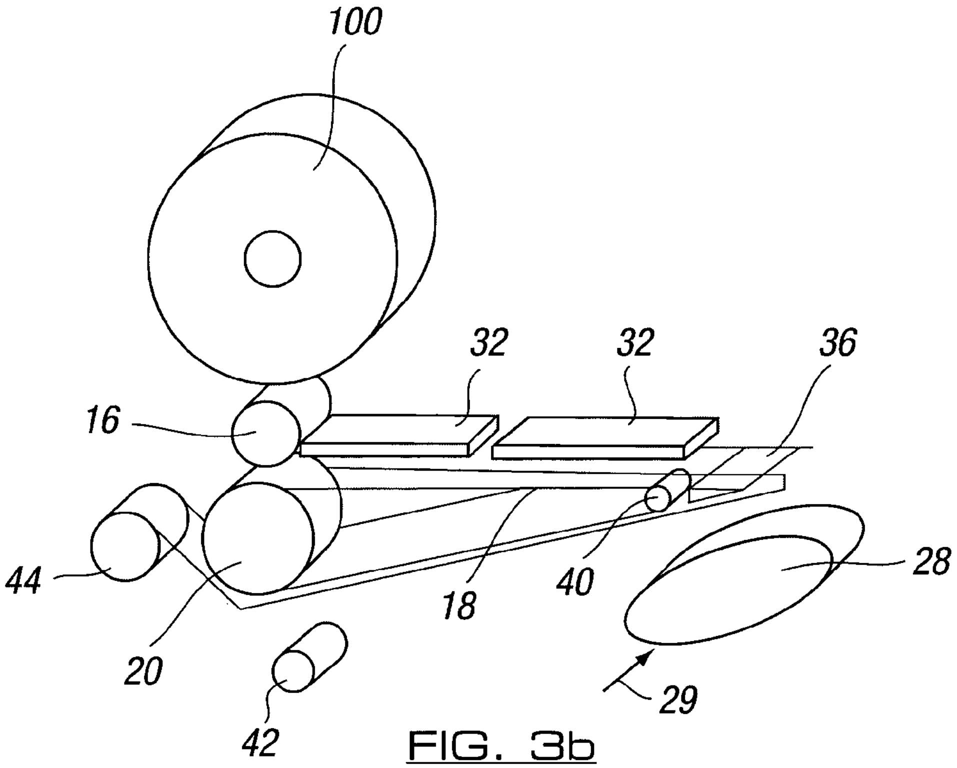

In both embodiments the apparatus can include a beak or blade 36 positioned for use in the separation of labels from a backing layer, if required, and a blade or beak 30 for use in the separation of labels from a linerless roll, if required. In FIG. 3*a* the apparatus is shown with both beaks or blades in position. In FIG. 3*b* the beak or blade is the same component and can be selectively positioned for use with, in this case the beak or blade 36 positioned for use to remove labels from the backing layer. In certain instances and with certain self adhesive label types a vacuum movement means is not required as is illustrated in FIG. 3*b*.

In each case the article 28 to which the self adhesive label is to be applied is moved as indicated by arrow 29 so that the self adhesive label is drawn onto the article and applied to the same.

A beak pulley 40 can be located behind the beak or blade 36 position and the surface area contact of the waste liner to the belt drives the web. A waste rewind roller 44 can also be provided as well as an optional guide roller 42 which holds the backing layer of the web to the belt 18.

Typically the control system used for the application of the linerless self adhesive label web has the same parameters as those required for the application of self adhesive labels from a backing layer web and therefore can be common to both forms of application.

FIG. 4 illustrates a plan view of the delivery belt which may be used in any of the embodiments described. In this case the belt is formed of three side by side belts 18', 18'', 18''' with the belt 18'' being further advanced as shown in terms of the direction of travel of the self adhesive label web. The advanced belt 18'' causes the self adhesive label web 19 to release from the two belts 18', 18''' at the same time as the web underlies the vacuum belt 16 and is attracted to the same. This is sufficient to assist the label to release from the advanced belt 18''.

FIG. 5 illustrates how the leading linerless label 32 can be released from the self adhesive label web 19 in accordance with one embodiment. In this case the respective labels in the web are defined by a line of weakening 4 and to separate the labels this line needs to be broken.

The line of weakening comprises a series of perforations and also slits 6. These slits are located along the line of weakening so as to engage with location portions 50 provided on the beak or blade 30. Thus the web 19 is stopped so as to position the line of weakening 4 under the blade 30 and when the leading label front edge engages with the moving article 28 the movement of the article with the label brings the line of weakening 4 and slits 6 into engagement with the location portions 50 which engage and act as retaining means against the continued movement of the label on the article. This retention is maintained until the line of weakening breaks and hence the label is released from the web to move away with the article.

FIGS. 6*a-b* illustrate a continuous feed application method. In FIGS. 6*a* and *b* the self adhesive label web 19 is advanced to varying speed nip rollers 52, 54 which slow the forward movement of the web as the blade 30 location portions contact with the line of weakening 4 in advance of the same. At this stage the rollers 56,58 downstream of the blade 30 are running at the faster speed and therefore provide the force on the label 32 to be separated which is sufficient to break the line of weakening and release the labels 32 from the web 19.

FIG. 7 illustrates a further embodiment of the invention. In this case the label supply web 100 is printed and die cut with the additional conversion step of "back slitting" or perforating the conventional backing layer along the length of the same with lines of weakness such as to form the backing layer, but not the label layer, into a middle and 2 outer sections. The web 100 is threaded around a conventional tension unwind roll arrangement 102 to feed the applicator.

At the transfer roller 104 the middle section 106 of the backing layer is drawn out and threaded to the waste rewind. This exposes the centre adhesive section of the labels 109 which are placed onto the release belt 110 which has a limited width typically which lies within the width of the exposed centre adhesive area.

The outer sections of the backing layer are retained in contact with the labels until the label is attached to the release belt and then drawn away around a path roller and the drive roller assembly 112 to the waste rewind. The labels 109 are spaced on the release belt exactly as they were when the backing layer was present and will be released from the belt 110 at the return belt or beak pulley 114 assisted by the vacuum movement means 116 as previously described.

Continued tension can be applied by ensuring that the vacuum movement means is not moving as fast as the article 118 to which the label is to be applied. It is possible to introduce a control system where the container is travelling at a given speed, the vacuum belt at a lesser speed and the self adhesive label web at a smaller speed still.

Contact of the leading edge of the self adhesive label to the container is typically required to be achieved before any tension introduced by the vacuum belt would strip the self adhesive label from the liner web. All these relative speeds can be varied as required.

FIG. 8 illustrates one form of label web for use with the apparatus of FIG. 7. The web supply is provide with a backing layer with lines of weakening 120,122. These lines of weakening allow the centre portion 124 of the backing layer to be removed to leave the edge portions 126,128 of the backing layer in place and the centre portion 124' to be formed by the adhesive surface of the label layer. Thus the web includes the shaped thin film labels 130 as it is merged to the release belt 110 such that the labels are still carried by the outer support sections 126,128 of the release liner. Once the labels are placed onto the release belt 110 in the required spacing the outer support sections 126, 128 are removed as described in FIG. 7 and the labels are advanced for application to the article. It should also be noted that the width of the release belt 110 is less than the width between the lines of weakening 120,122 It should also be appreciated that although the labels are shown as spaced apart in this Figure the labels may be separated by lines of weakening rather than spaces, in which case the line of weakening is required to be broken to allow the leading label to be applied and a blade will be positioned between the vacuum movement means and the article to which the label is to be applied.

There is therefore provided in accordance with this application the ability to apply conventional thin packaging grade films as linerless self adhesive labels by the combination of a series of delivery belts 18, 110 supplemented by a vacuum movement means 26 acting on the non adhesive side of the self adhesive labels to ensure the label releases from the delivery belts carrying the label on the adhesive side. The advantage of this is that when the web feed stops with the label adjacent to the separation blade the web tension is controlled by contact to the delivery belt and the vacuum belt. This allows the characteristic of the delivery belt allowing the adhesive label to separate at an angle but achieve huge lateral cohesion when pulled in the line of belt profile to be exploited to advantage in the control of the application of the label. Further more the apparatus as herein described allows similar performance to be achieved with a conventional label on a backing layer which typically will have a relatively low release value. This ensures that the self adhesive label is always either continuously stripped from the liner or if the web movement does stop it has a substantial surface area stripped from the liner and supported by the vacuum roller. The leading edge of the label is tacked to the article movement as a minimal length of that label is still attached to the backing layer which creates an initial stretch onto the label which aids the lay down and wet out of the label application.

The invention claimed is:

1. Apparatus for the application of self adhesive labels sequentially from a supply of self adhesive labels, said apparatus including means for moving the self adhesive labels web from the supply to an application point, said application point including means to cause release of the leading label from the web of self adhesive labels and expose the said released label to be further transported and/or applied to an article and wherein said apparatus is, or can be adapted to be, capable of operation with a supply of labels with a backing layer and a supply of labels without a backing layer and wherein lines of weakening are provided between adjacent labels on the label web and the lines of weakening include at least one slit which is located so as to engage with a location formed on a beak or blade provided to break the line of weakening, the means for moving the labels from the roll to the application point includes at least two movement means which act on the labels to move the same and at least one of the said movement means is located so as to act on the non-adhesive side of the label supply, further movement means act on the adhesive side of the label either directly in the case of linerless self adhesive label supplies or on the backing layer onto which the adhesive surface of the label is applied the said further movement means incorporates at least one belt provided in a split configuration in which there is provided a central belt and a belt on either side thereof and wherein the central belt can be driven independently of the said side belts.

2. Apparatus according to claim 1 wherein the blade or beak which is used is of a form that is changeable between a first form to allow the release of a label from a linerless roll of self adhesive labels and a second form to allow the release of a label from a roll of self adhesive labels with a backing layer.

3. Apparatus according to claim 2 wherein the two forms of blade or beak are provided on the same component.

4. Apparatus according to claim 1 wherein the beak or blade is provided at different locations and selectively used dependent upon the particular form of the roll of self adhesive labels being applied at that time.

5. Apparatus according to claim 1 wherein the movement means which act on the non adhesive side of the self adhesive label is provided in a form so as to encourage movement of the self adhesive label web towards the application location and away from the movement means acting on the adhesive side of the label supply.

6. Apparatus according to claim 5 wherein the movement means include the generation of an air flow to enhance the movement of the labels and ensure that the label supply releases from the belt acting on the adhesive side.

7. Apparatus according to claim 1 wherein the adhesive is applied to the label surface in a series of strips with at least one gap left between said strips and which gap is exposed at least one edge of the label.

* * * * *